US007940422B2

(12) United States Patent
Maeda

(10) Patent No.: US 7,940,422 B2
(45) Date of Patent: May 10, 2011

(54) IMAGE FORMING APPARATUS

(75) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 823 days.

(21) Appl. No.: 11/902,104

(22) Filed: Sep. 19, 2007

(65) Prior Publication Data

US 2008/0084571 A1    Apr. 10, 2008

(30) Foreign Application Priority Data

Sep. 19, 2006   (JP) ................................. 2006-253506

(51) Int. Cl.
*H04N 1/40* (2006.01)
(52) U.S. Cl. ........................................ 358/1.9; 358/504
(58) Field of Classification Search .................. 358/1.9, 358/2.1, 500–504, 540; 399/72, 301, 38, 399/46, 49; 347/19, 116, 133
See application file for complete search history.

(56) References Cited

U.S. PATENT DOCUMENTS 6,198,549 B1 *   3/2001   Decker et al. ................. 358/504
6,526,240 B1 *   2/2003   Thomas et al. ................. 399/72
7,114,790 B2 *  10/2006   Seki et al. ......................... 347/5

FOREIGN PATENT DOCUMENTS

| JP | 10-044502   | 2/1998  |
| JP | 2000-112205 | 4/2000  |
| JP | 2004-295083 | 10/2004 |

* cited by examiner

*Primary Examiner* — Thomas D Lee
*Assistant Examiner* — Stephen M Brinich
(74) *Attorney, Agent, or Firm* — Harness, Dickey & Pierce, PLC

(57) ABSTRACT

An image forming apparatus for forming a multicolor image by superposing single-color images of respective colors is disclosed. The image forming apparatus includes an image formation control unit configured to select and form a misalignment correction pattern used in a misalignment correction process for correcting misalignment between the single-color images. The image formation control unit selects the misalignment correction pattern according to either a status change detected or the number of images formed after a previous misalignment correction process is performed.

17 Claims, 14 Drawing Sheets

IMAGE FORMING APPARATUS

BACKGROUND OF THE INVENTION

1. Field of the Invention

The present invention generally relates to an image forming apparatus that forms a multicolor image by superposing single-color images.

2. Description of the Related Art

Some color image forming apparatuses, such as color printers, form a multicolor image by superposing single-color images of different colors. When forming an image with such an image forming apparatus, misalignment between superposed single-color images may occur because of various factors such as changes in ambient temperature in a space where the image forming apparatus is installed and changes in temperature inside of the image forming apparatus. The misalignment in turn causes changes in color of drawings and texts or non-uniformity (color irregularity) in images and thereby reduces their quality. Therefore, to obtain good image quality, it is necessary to align single-color images as accurately as possible.

To accurately align single color images, various mechanisms for correcting misalignment between single-color images are proposed for use in an image forming apparatus that forms single color images using, for example, multiple photoconductor units and then superposes the single-color images to form a multicolor image.

Japanese Patent No. 3569392 (patent document 1) discloses a deflecting mirror control device that makes it possible to accurately correct misalignment between toner images of different colors and thereby to form a high-quality image. In addition, the disclosed device includes a mechanism to report a malfunction in an image forming apparatus so that the image forming apparatus can be repaired before misalignment between toner images increases and image quality is greatly degraded.

Japanese Patent Application Publication No. 2000-112205 (patent document 2) discloses a color image forming apparatus including a magnification adjusting unit for correcting magnification of a reference color image. With the magnification adjusting unit, the disclosed apparatus can accurately correct magnification of single-color images including the reference color image. Japanese Patent Application Publication No. 2004-295083 (patent document 3) discloses an image forming apparatus and an image forming method that make it possible to easily correct a magnification error of an image and any irregularity at the edge of an image for each deflection surface even if these problems change over time and thereby make it possible to form a high-quality image.

As a common method used in patent documents 1 through 3, misalignment correction patterns formed on a transfer belt are detected using multiple sensors and misalignment between single-color images is corrected based on signals from the sensors.

[Patent document 1] Japanese Patent No. 3569392
[Patent document 2] Japanese Patent Application Publication No. 2000-112205
[Patent document 3] Japanese Patent Application Publication No. 2004-295083

In the above method of correcting misalignment between single-color images, the accuracy of the correction improves as the number of misalignment correction patterns to be detected by each sensor increases. However, as the number of misalignment correction patterns increases, the time necessary to detect the patterns increases and, as a result, the time necessary to correct the misalignment increases. Accordingly, this reduces the printing speed of an image forming apparatus.

Meanwhile, to correct misalignment while printing multiple images, it is necessary to form misalignment correction patterns between the images (or pages) on a transfer belt. In this case, since misalignment correction patterns are formed between pages, timings and areas for forming the misalignment correction patterns are restricted. Although the restriction can be eased by increasing the interval between pages on a transfer belt, it results in longer printing time and lower printing speed.

SUMMARY OF THE INVENTION

Embodiments of the present invention provide an image forming apparatus that solves or reduces one or more problems caused by the limitations and disadvantages of the related art.

An embodiment of the present invention provides an image forming apparatus for forming a multicolor image by superposing single-color images of respective colors. The image forming apparatus includes an image formation control unit configured to select and form a misalignment correction pattern used in a misalignment correction process for correcting misalignment between the single-color images; wherein the image formation control unit is configured to select the misalignment correction pattern according to either a status change detected or the number of images formed after a previous misalignment correction process is performed.

Another embodiment of the present invention provides an image forming apparatus for forming a multicolor image by superposing single-color images of respective colors. The image forming apparatus includes an image formation control unit configured to form a misalignment correction pattern for correcting misalignment between the single-color images; wherein the image formation control unit is configured to form a first misalignment correction pattern for a first one of multicolor images to be formed successively and to form a second misalignment correction pattern that is different from the first misalignment correction pattern for a next one of the multicolor images.

DESCRIPTION OF THE PREFERRED EMBODIMENTS

Preferred embodiments of the present invention are described below with reference to the accompanying drawings.

An image forming apparatus according to an embodiment of the present invention includes an image formation control unit that selects and forms a misalignment correction pattern used in a misalignment correction process for correcting misalignment between single-color images of respective colors. The image formation control unit selects an appropriate misalignment correction pattern according to either a status change detected or the number of images formed after a previous misalignment correction process is performed.

First Embodiment

Figure 1:
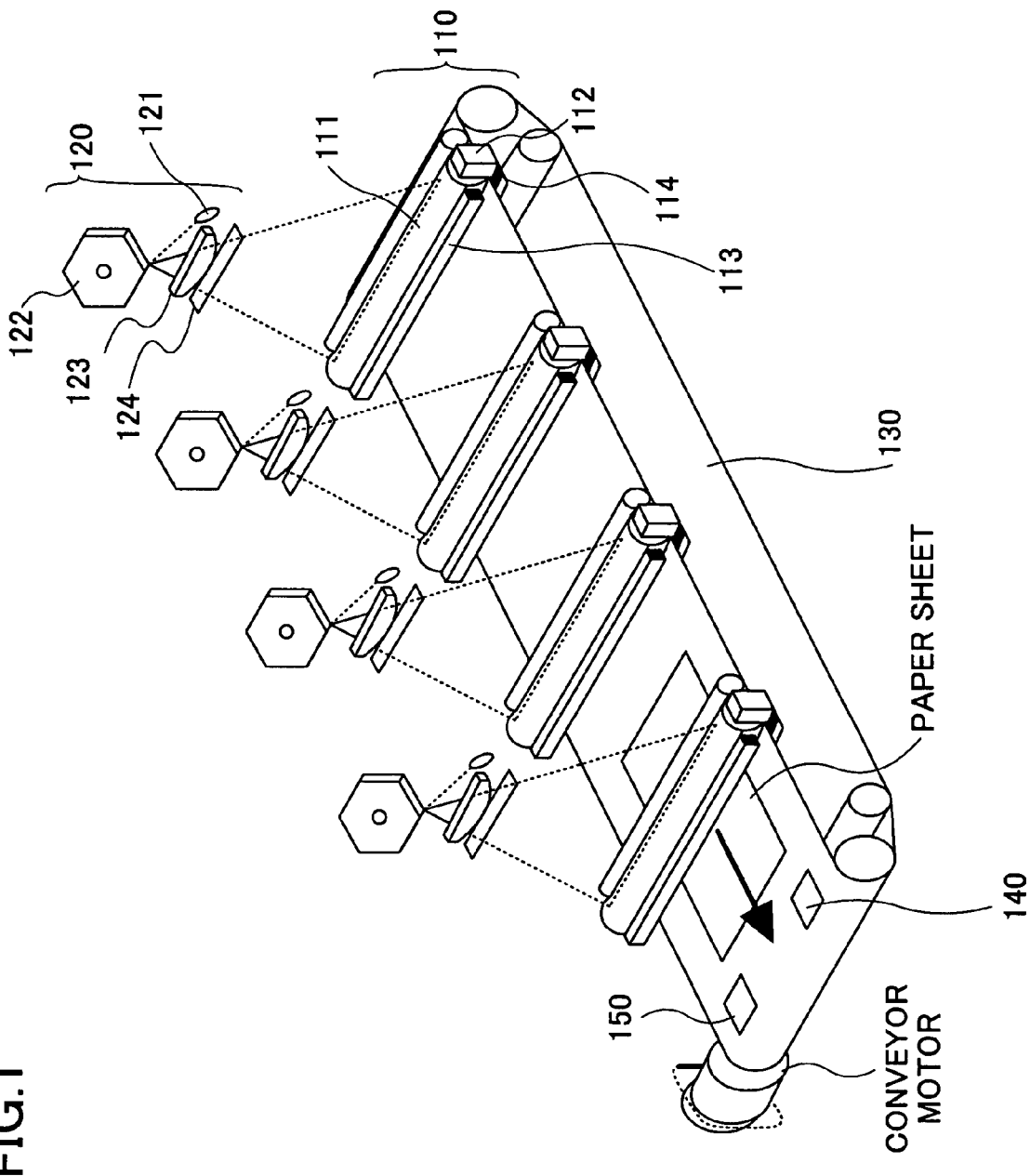
FIG. 1 is a perspective view of an image formation block of an image forming apparatus 100 according to a first embodiment of the present invention.

A first embodiment of the present invention is described below with reference to the accompanying drawings. FIG. 1 is a perspective view of an image formation block of an image forming apparatus 100 according to the first embodiment.

The image forming apparatus 100 is a four-drum image forming apparatus configured to form a multicolor image by superposing four single-color images of yellow (Y), magenta (M), cyan (C), and black (BK).

The image forming apparatus 100 includes four sets of image forming units 110 and light-beam scanning devices 120 corresponding to the four colors mentioned above, a transfer belt (transfer body) 130, a sensor 140, and a sensor 150. The image forming apparatus 100 transfers single-color images of a first color, a second color, a third color, and a fourth color in the order mentioned onto the transfer belt 130 and then transfers the single-color images superposed on the transfer belt 130 onto a paper sheet being conveyed by the transfer belt 130 in the direction of an arrow shown in FIG. 1 (this direction is hereafter called the sub-scanning direction). Thus, the image forming apparatus 100 forms a multicolor image on a paper sheet by superposing four single-color images. The formed multicolor image is fused onto the paper sheet by a fusing unit (not shown) and the paper sheet with the formed multicolor image is then ejected from the image forming apparatus 100.

Each of the image forming units 110 includes a photosensitive drum (image carrier) 111, a developing unit 112, a charger 113, and a transfer unit 114. The developing unit 112, the charger 113, and the transfer unit 114 are disposed around the photosensitive drum 111. The image forming unit 110 also includes a cleaning unit (not shown) and a discharging unit (not shown) disposed around the photosensitive drum 111. Thus, the image forming unit 110 is configured to form an image on a paper sheet through a normal electrophotographic process including charge, exposure, development, and transfer steps.

The light-beam scanning device 120 includes a laser diode (LD) unit 121, a polygon mirror 122, an fθ lens 123, and a barrel toroidal lens (BTL) 124. The LD unit 121 includes a laser diode that is driven according to image data input to the image forming apparatus 100. A light beam emitted from the laser diode is collimated by a collimator lens (not shown) and output from the LD unit 121. The output light beam passes through a cylinder lens (not shown) and is deflected by the polygon mirror 122 being rotated by a polygon motor (not shown).

The deflected light beam passes through the fθ lens 123 and the BTL 124, is reflected by a mirror (not shown), and scans the surface of the photosensitive drum 111. The BTL 124 focuses the light beam in the main-scanning direction. In other words, the BTL 124 concentrates the light beam and adjusts the position of the light beam in the sub-scanning direction.

The sensors 140 and 150 are reflective optical sensors and are used to detect misalignment correction patterns for correcting misalignment between single-color images transferred onto the transfer belt 130. The image forming apparatus 100 corrects misalignment between single-color images in the main-scanning and sub-scanning directions and corrects magnification of single-color images in the main-scanning direction based on the results of detecting misalignment correction patterns by the sensors 140 and 150. Details of misalignment correction patterns and a misalignment correction process are described later.

Figure 2:
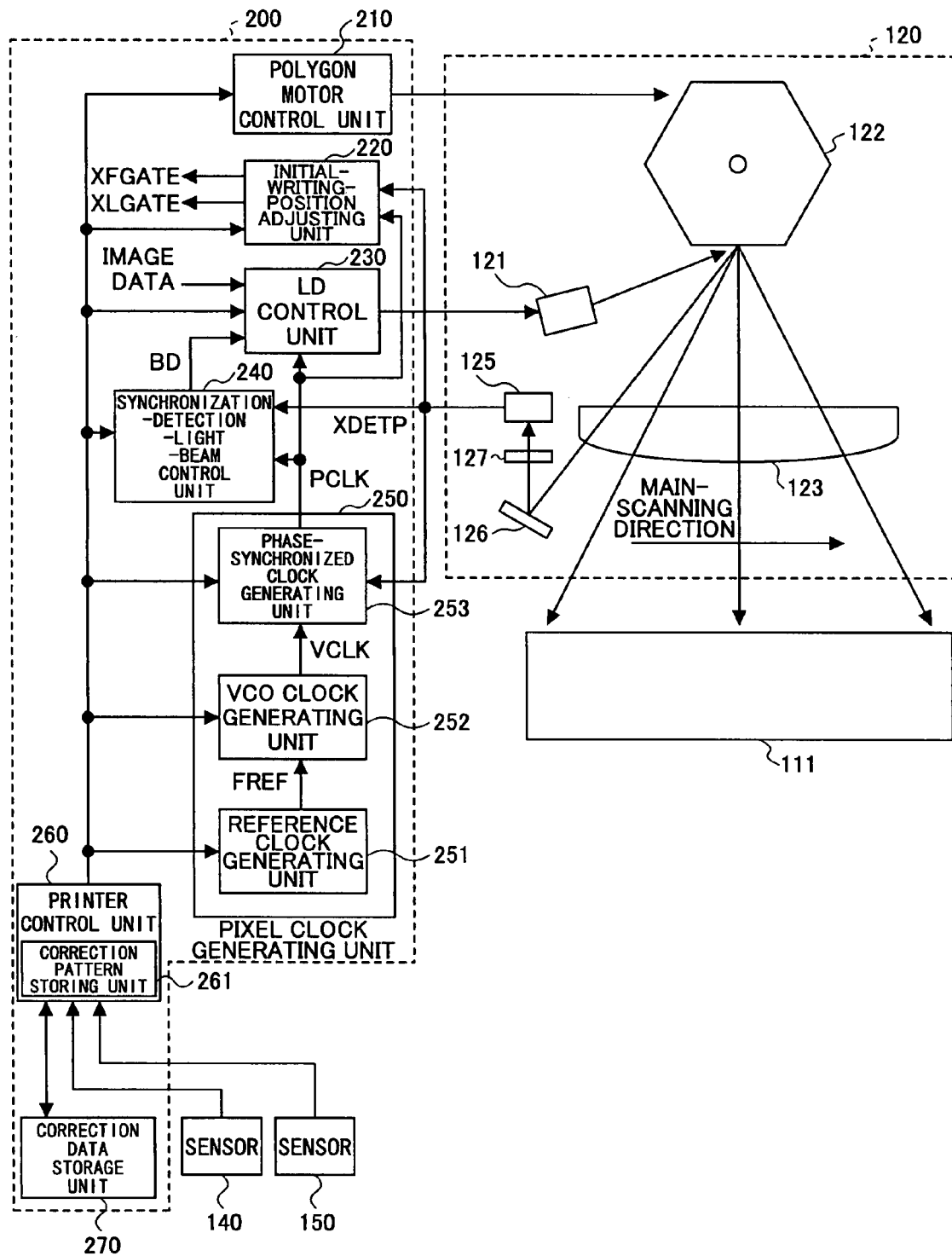
FIG. 2 is a drawing illustrating an image formation control unit 200 and a light-beam scanning device 120.

The light-beam scanning device 120 and an image formation control unit 200 for controlling the image forming units 110 are described below with reference to FIG. 2. FIG. 2 is a drawing illustrating the image formation control unit 200 and the light-beam scanning device 120.

Parts of the light-beam scanning device 120 other than those described above with reference to FIG. 1 are described below.

The light-beam scanning device 120 further includes a synchronization detection sensor 125 disposed at one end of the main-scanning direction so as to be able to detect a light beam emitted according to image data. In the light-beam scanning device 120, a light beam passing through the fθ lens 123 is reflected by a mirror 126, is focused by a lens 127, and enters the synchronization detection sensor 125.

Next, an exemplary configuration of the image formation control unit 200 is described below.

The image formation control unit 200 includes a polygon motor control unit 210, an initial-writing-position adjusting unit 220, an LD control unit 230, a synchronization-detection-light-beam control unit 240, a pixel clock generating unit 250, a printer control unit 260, and a correction data storage unit 270.

The polygon motor control unit 210 causes a polygon motor (not shown) to rotate at a specified rotational speed according to a control signal from the printer control unit 260 and thereby rotates the polygon mirror 122. The initial-writing-position adjusting unit 220 controls a timing when a light beam is emitted according to image data or a timing when image writing is started. The LD control unit 230 controls a laser diode of the LD unit 121 of the light-beam scanning device 120. The synchronization-detection-light-beam control unit 240 causes the laser diode to emit a light beam to be detected by the synchronization detection sensor 125 of the light-beam scanning device 120. In the descriptions below, emission of a light beam according to image data is called image writing.

The pixel clock generating unit 250 generates a synchronizing clock signal used to write image data. The printer control unit 260 controls other components of the image formation control unit 200 and controls a misalignment correction process in the image forming apparatus 100. The correction data storage unit 270 stores correction data obtained by detecting misalignment correction patterns by the sensors 140 and 150. Details of misalignment correction patterns and correction data are described later.

An exemplary image forming process by the light-beam scanning device 120 and the image formation control unit 200 is described below.

When receiving an image formation request signal, the printer control unit 260 transfers the signal to the synchronization-detection-light-beam control unit 240. The synchronization-detection-light-beam control unit 240 outputs a synchronization-detection-light-beam emission signal BD to the LD control unit 230 to drive the laser diode of the LD unit 121 and thereby to start the operation of the light-beam scanning device 120.

When receiving the synchronization-detection-light-beam emission signal BD, the LD control unit 230 causes the laser diode of the LD unit 121 to emit light. The light beam emitted from the laser diode is deflected by the polygon mirror 122. The deflected light beam passes through the fθ lens 123, is reflected by the mirror 126, is focused by the lens 127, and enters the synchronization detection sensor 125.

When receiving the light beam, the synchronization detection sensor 125 outputs a synchronization detection signal XDETP to the initial-writing-position adjusting unit 220, the synchronization-detection-light-beam control unit 240, and the pixel clock generating unit 250.

When receiving the synchronization detection signal XDETP, the pixel clock generating unit 250 generates a pixel clock signal PCLK synchronized with the synchronization detection signal XDETP and outputs the pixel clock signal PCLK to the LD control unit 230 and the synchronization-detection-light-beam control unit 240. Details of the pixel clock generating unit 250 are described later with reference to the corresponding figure.

After starting the operation of the light-beam scanning device 120, the synchronization-detection-light-beam control unit 240 outputs the synchronization-detection-light-beam emission signal BD to the LD control unit 230 according to the synchronization detection signal XDETP from the synchronization detection sensor 125. The synchronization-detection-light-beam control unit 240 is preferably configured to cause the laser diode of the LD unit 121 to emit a light beam according to the synchronization detection signal XDETP and the pixel clock PCLK at an intensity that does not cause a flare but is intense enough for the synchronization sensor 125 to generate the synchronization detection signal XDETP.

The initial-writing-position adjusting unit 220 generates a main-scanning gate signal XLGATE and a sub-scanning gate signal XFGATE for determining timings to start image writing based on the synchronization detection signal XDETP, the pixel clock signal PCLK, and a control signal from the printer control unit 260. Details of the initial-writing-position adjusting unit 220 are described later with reference to the corresponding figure.

The LD control unit 230 causes the laser diode of the LD unit 121 to emit a light beam according to the synchronization-detection-light-beam emission signal BD and an image data signal synchronized with the pixel clock signal PCLK. The light beam emitted from the LD unit 121 is deflected by the polygon mirror 122, passes through the fθ lens 123, and scans the photosensitive drum 111. The image data signal is described later in more detail.

Thus, a latent image is formed on the photosensitive drum (image carrier) 111 according to an image data signal. The latent image is then developed by the developing unit 112 and transferred onto the transfer belt (transfer body) 130 as a single-color image. Transferred single-color images of respective colors are superposed on the transfer belt 130 to form a multicolor image. In the image forming apparatus 100, a multicolor image is formed through the above process. In the above process, alternatively, the single-color images may be transferred directly onto a paper sheet being conveyed on the transfer belt 130.

The printer control unit 260 includes a correction pattern storing unit 261 for storing data of misalignment correction patterns and is configured to control other components of the image formation control unit 200 as well as a process of correcting misalignment between single-color images. In a misalignment correction process, the printer control unit 260 selects appropriate misalignment correction patterns and causes the image formation control unit 200 to form the selected misalignment correction patterns at a predetermined timing. Next, the printer control unit 260 causes the sensors 140 and 150 to detect the formed misalignment correction patterns and calculates correction data based on the detection results. Then, the printer control unit 260 stores the calculated correction data in the correction data storage unit 270. Correction data and a misalignment correction process are described later in more detail.

Figure 3:
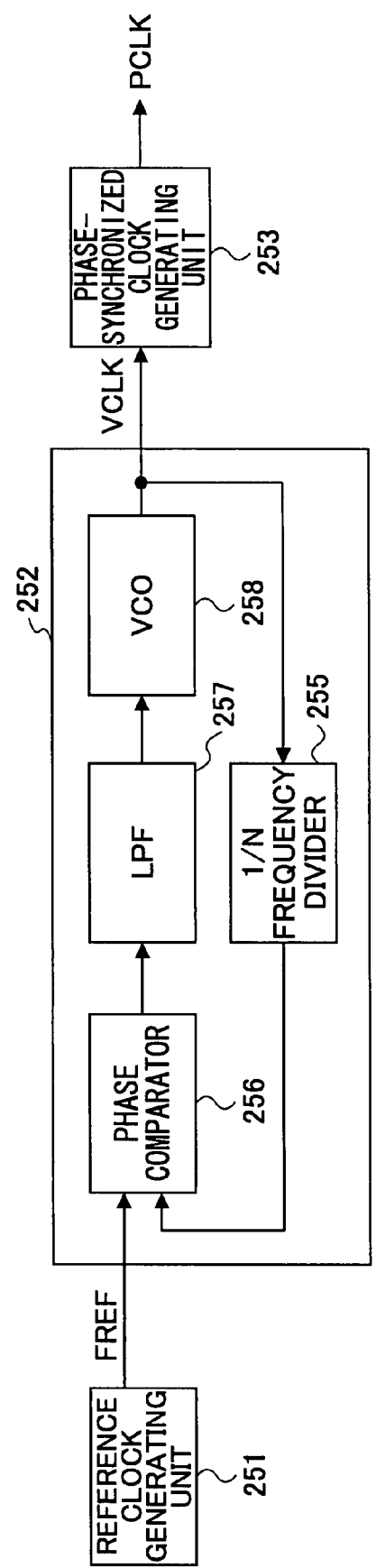
FIG. 3 is a block diagram illustrating a pixel clock generating unit 250.

The pixel clock generating unit 250 is described below with reference to FIG. 3. FIG. 3 is a block diagram illustrating the pixel clock generating unit 250.

The pixel clock generating unit 250 includes a reference clock generating unit 251, a voltage controlled oscillator (VCO) clock generating unit 252, and a phase-synchronized clock generating unit 253.

The VCO clock generating unit 252 is a phase-locked loop (PLL) circuit. In the VCO clock generating unit 252, a reference clock signal FREF from the reference clock generating unit 251 and a signal obtained by frequency-dividing a signal VCLK, which is an output of the VCO clock generating unit 252, by N with an 1/N frequency divider 255 are input to a phase comparator 256. The phase comparator 256 compares phases of falling edges of the input signals and outputs the difference as a constant current output. A low-pass filter (LPF) 257 removes unnecessary high-frequency components and noise from the constant current output and sends the constant current output to a voltage controlled oscillator (VCO) 258. The VCO 258 outputs an oscillating frequency that varies depending on the output from the LPF 257. Accordingly, the signal VCLK from the VCO clock generating unit 252 can be changed by changing the reference clock signal FREF and the frequency dividing ratio N by the printer control unit 260.

The phase-synchronized clock generating unit 253 generates the pixel clock signal PCLK synchronized with the synchronization detection signal XDETP from the signal VCLK generated by the VCO clock generating unit 252.

Figure 4:
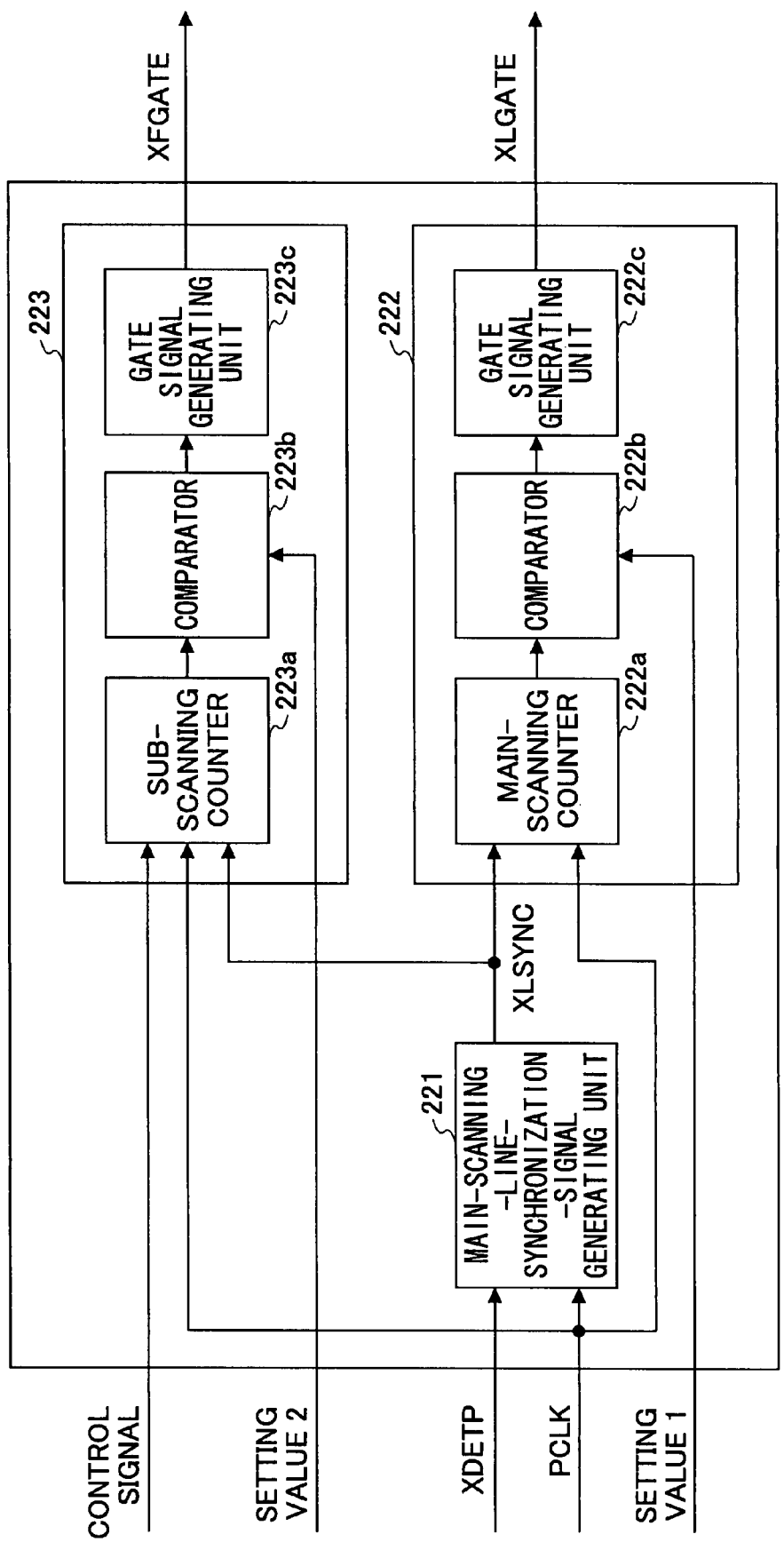
FIG. 4 is a block diagram illustrating an initial-writing-position adjusting unit 220.

The initial-writing-position adjusting unit 220 is described below with reference to FIG. 4. FIG. 4 is a block diagram illustrating the initial-writing-position adjusting unit 220.

The initial-writing-position adjusting unit 220 includes a main-scanning-line-synchronization-signal generating unit 221, a main-scanning-gate-signal generating unit 222, and a sub-scanning-gate-signal generating unit 223.

The main-scanning-line-synchronization-signal generating unit 221 generates a signal XLSYNC from the synchronization detection signal XDETP and the pixel clock signal PCLK. The signal XLSYNC is used to operate a main-scanning counter 222a of the main-scanning-gate-signal generating unit 222 and a sub-scanning counter 223a of the sub-scanning-gate-signal generating unit 223.

The main-scanning-gate-signal generating unit 222 generates the main-scanning gate signal XLGATE that determines a timing when the LD control unit 230 reads image data (i.e. a timing when the LD control unit 230 performs image writing in the main-scanning direction). The sub-scanning-gate-signal generating unit 223 generates the sub-scanning gate signal XFGATE that determines a timing when the LD control unit 230 reads image data (i.e. a timing when the LD control unit 230 performs image writing in the sub-scanning direction).

The main-scanning-gate-signal generating unit 222 includes the main-scanning counter 222a that operates based on the signal XLSYNC and the pixel clock signal PCLK, a comparator 222b that compares a count from the main-scanning counter 222a and a setting value 1 (correction data) from the printer control unit 260, and a gate signal generating unit 222c that generates the main-scanning gate signal XLGATE based on the comparison result from the comparator 222b.

The sub-scanning-gate-signal generating unit 223 includes the sub-scanning counter 223a that operates based on the signal XLSYNC, the pixel clock signal PCLK, and a control signal from the printer control unit 260, a comparator 223b that compares a count from the sub-scanning counter 223b and a setting value 2 (correction data) from the printer control unit 260, and a gate signal generating unit 223c that generates the sub-scanning gate signal XFGATE based on the comparison result from the comparator 223b.

The initial-writing-position adjusting unit 220 adjusts an initial writing position of an image in the main-scanning direction in units of cycles of the pixel clock signal PCLK, i.e. in units of dots. In other words, the initial-writing-position adjusting unit 220 can correct the position of an image in the main-scanning direction in units of dots. The initial-writing-position adjusting unit 220 can also adjust an initial writing position of an image in the sub-scanning direction in units of cycles of the signal XLSYNC, i.e. in units of lines that extend along the main-scanning direction. The setting values 1 and 2 are correction data stored in the correction data storage unit 270.

Figure 5:
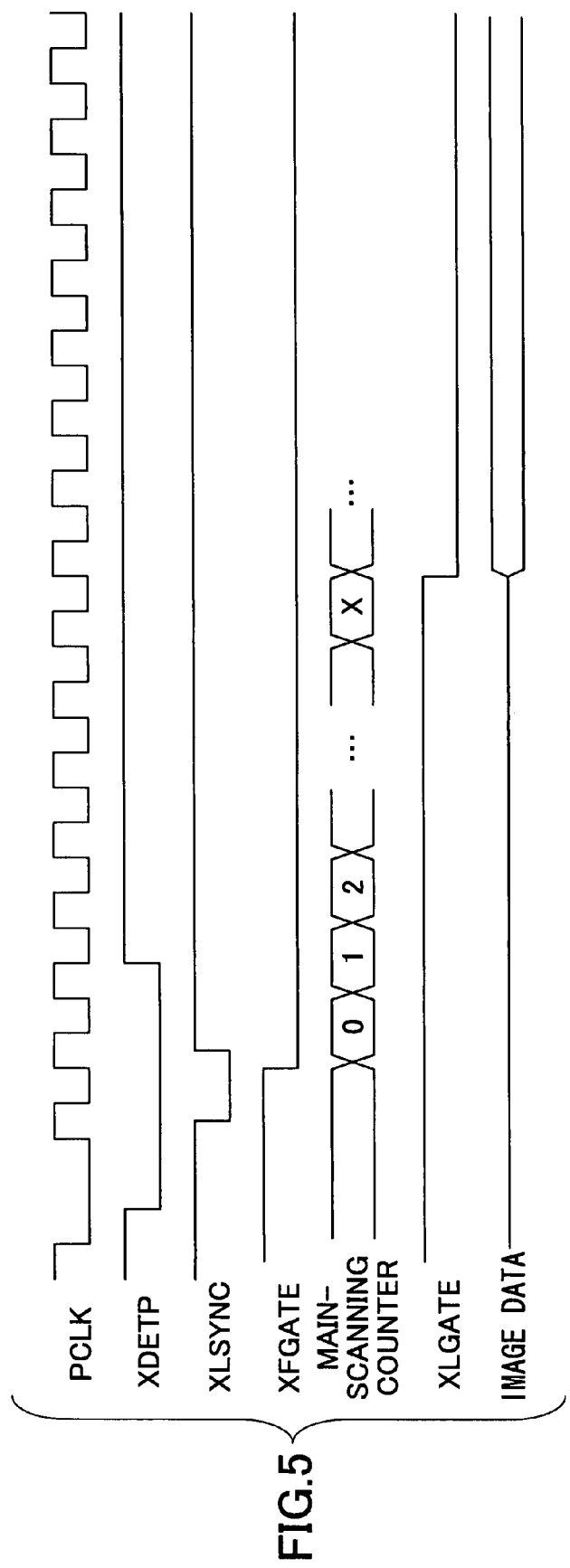
FIG. 5 is a timing chart used to describe an exemplary operation of the initial-writing-position adjusting unit 220.

An exemplary operation of the initial-writing-position adjusting unit 220 is described below with reference to FIG. 5. FIG. 5 is a timing chart used to describe an exemplary operation of the initial-writing-position adjusting unit 220.

In the main-scanning-gate-signal generating unit 222, the main-scanning counter 222a is reset by the signal XLSYNC and is caused to start counting by the pixel clock signal PCLK. The comparator 222b compares the count from the main-scanning counter 222a and the setting value 1 from the printer control unit 260. When the count reaches the setting value 1, the comparator 222b outputs a signal to the gate signal generating unit 222c. When receiving the signal from the comparator 222b, the gate signal generating unit 222c turns the main-scanning gate signal XLGATE to the low (L) level. The main-scanning gate signal XLGATE remains at the L level for a period of time corresponding to the width of an image in the main-scanning direction. In this embodiment, the main-scanning gate signal XLGATE is valid when it is at the L level. When the main-scanning gate signal XLGATE becomes valid, the LD control unit 230 reads image data.

The operation of the sub-scanning-gate-signal generating unit 223 is substantially the same as that of the main-scanning-gate-signal generating unit 222 except that the sub-scanning counter 223a is caused to start counting by the signal XLSYNC and the comparator 223b compares the count from the sub-scanning counter 223b and the setting value 2.

Next, image data read by the LD control unit 230 according to the main-scanning gate signal XLGATE and the sub-scanning gate signal XFGATE are described. In the image forming apparatus 100, image data are input from a front-end unit of the image formation control unit 200 into the LD control unit 230.

Figure 6:
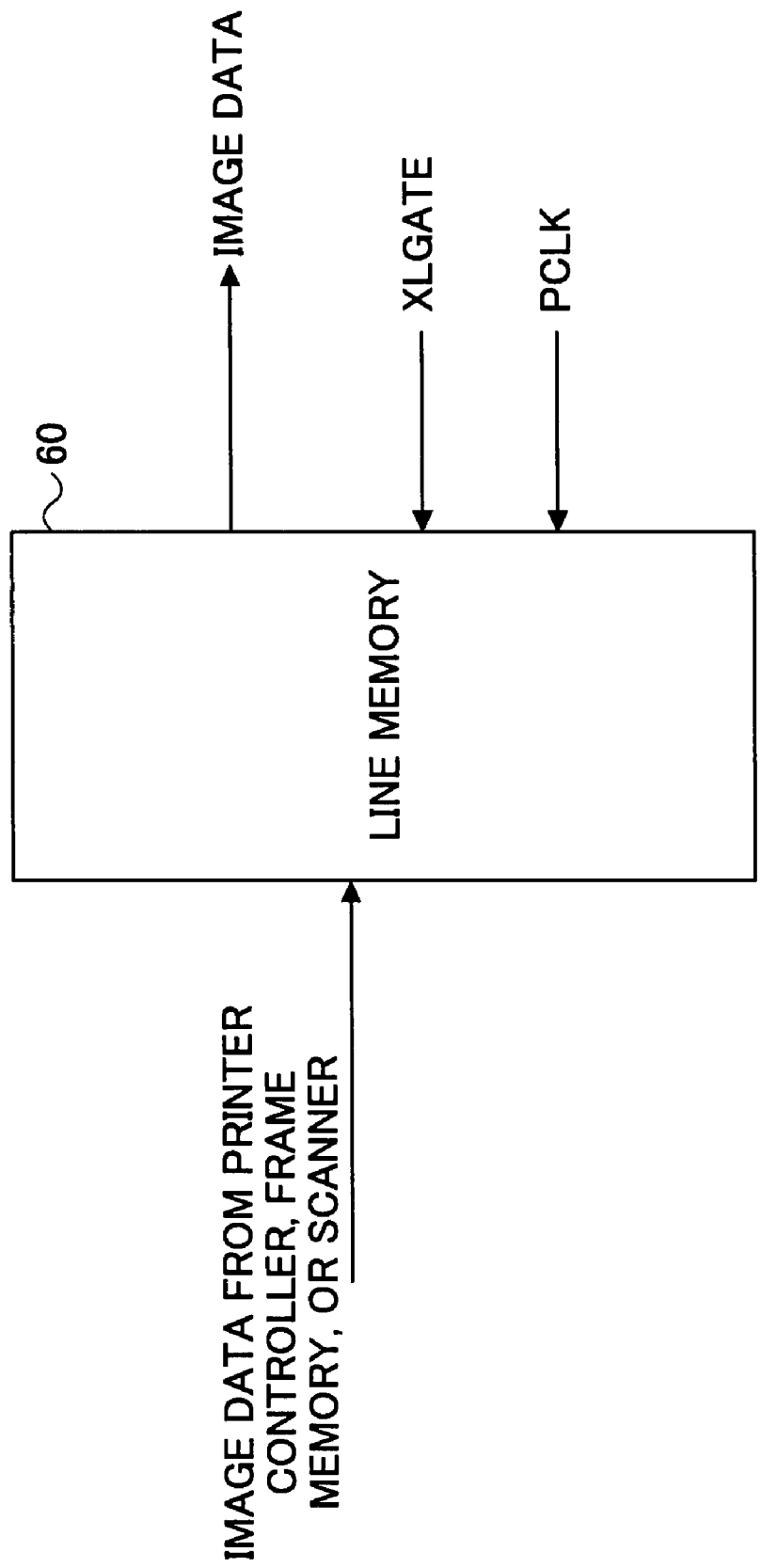
FIG. 6 is a drawing illustrating a front-end unit of the image formation control unit 200.

FIG. 6 is a drawing illustrating a front-end unit of the image formation control unit 200.

A line memory 60 is provided as a front-end unit of the image formation control unit 200. Image data are input into the line memory 60 in synchronization with the sub-scanning gate signal XFGATE from, for example, a printer controller, a frame memory, or a scanner (which are not shown). The line memory 60 outputs the image data in synchronization with the pixel clock signal PCLK while the main-scanning gate signal XLGATE is at the L level. The image data output from the line memory 60 are sent to the LD control unit 230 in synchronization with the pixel clock signal PCLK and the laser diode of the LD unit 121 is driven according to the image data.

An exemplary method of detecting misalignment between single-color images and exemplary misalignment correction patterns of this embodiment are described below.

In the image forming apparatus 100 of this embodiment, misalignment correction patterns are formed and transferred onto the transfer belt (transfer body) 130 in substantially the same manner as forming and transferring an image according to image data. Formation and transfer of misalignment correction patterns are described below.

The printer control unit 260 selects appropriate misalignment correction patterns from the misalignment correction patterns stored in the correction pattern storing unit 261. Then, the printer control unit 260 sends data of the selected misalignment correction patterns from the correction pattern storing unit 261 to the LD control unit 230. According to the misalignment correction pattern data, the LD control unit 230 causes the laser diode of the LD unit 121 to emit light and thereby forms latent images of the misalignment correction patterns on the photosensitive drums 111 provided for respective colors. The formed latent images are developed with toner and the toner images are transferred onto the transfer belt 130. In the image forming apparatus 100, misalignment correction patterns are thus formed on the transfer belt 130.

Formation of misalignment correction patterns is performed by the printer control unit 260 at predetermined timings. The printer control unit 260 of the image forming apparatus 100 of this embodiment is configured to select appropriate misalignment correction patterns from those stored in the correction pattern storing unit 261 according to, for example, a status change detected or the number of images (or pages) formed after misalignment correction patterns are transferred onto the transfer belt 130 the previous time. An explanation on "status change" is given later.

The image forming apparatus 100 can accurately and quickly correct misalignment between single-color images caused by various factors by using misalignment correction patterns that are suitable for the current situation.

Figure 7:
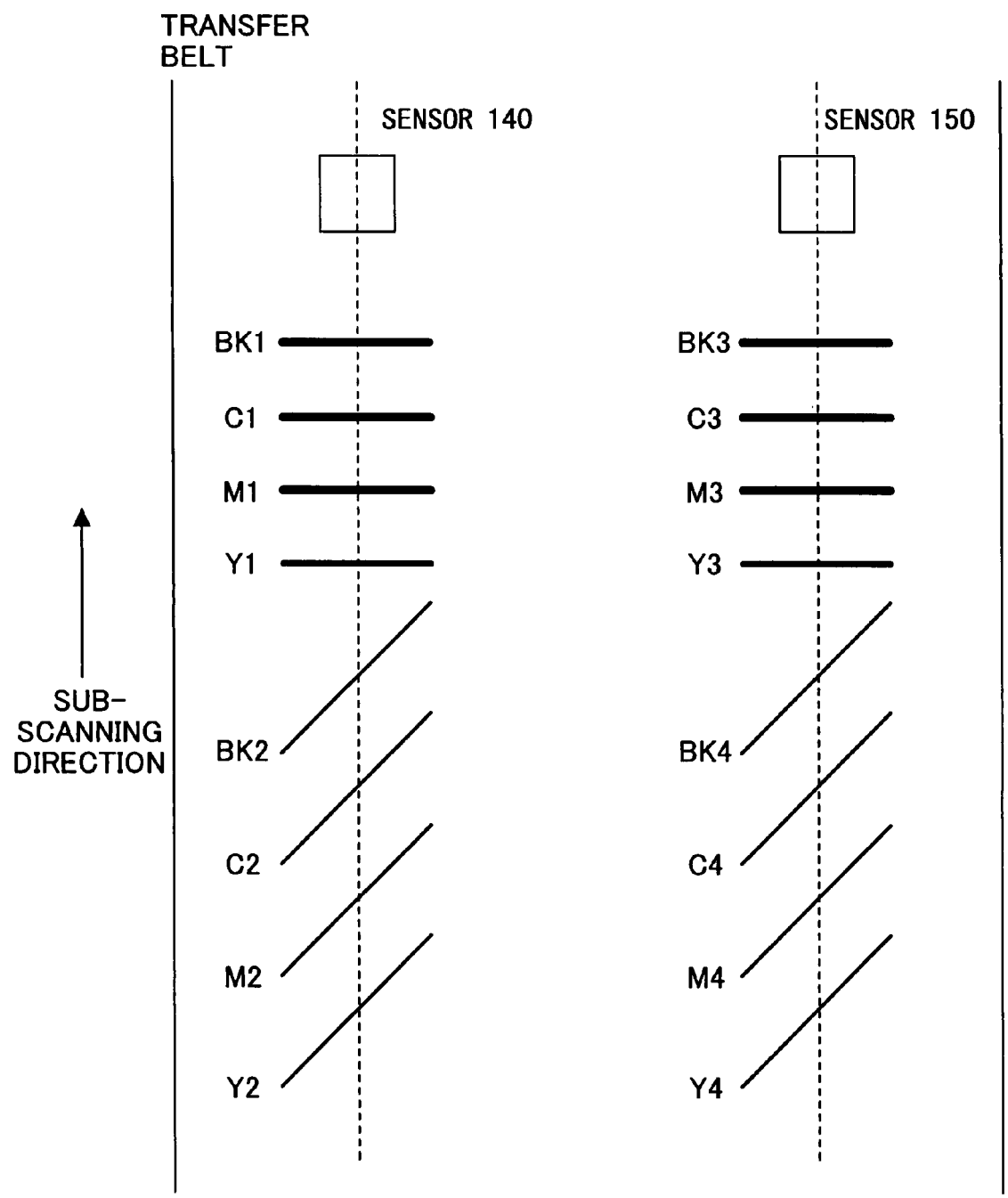
FIG. 7 is a drawing illustrating exemplary misalignment correction patterns according to the first embodiment.

FIG. 7 is a drawing illustrating exemplary misalignment correction patterns according to the first embodiment.

In the image forming apparatus 100 of this embodiment, as shown in FIG. 7, misalignment correction patterns comprising horizontal lines and diagonal lines of respective colors are formed on the transfer belt 130 at predetermined timings. The horizontal lines and the diagonal lines of the misalignment correction patterns are detected sequentially by the sensors 140 and 150 as the transfer belt 130 moves in the sub-scanning direction indicated by an arrow in FIG. 7. The detection results are sent to the printer control unit 260.

Based on the detection results, the printer control unit 260 calculates the amount of misalignment, i.e. the amount of time corresponding to the amount of misalignment, of each single-color image other than a black-color image with respect to the black-color image. When there is misalignment or a magnification error in the main-scanning direction, the timings when the sensors 140 and 150 detect diagonal lines are influenced. When there is misalignment in the sub-scanning direction, the timings when the sensors 140 and 150 detect horizontal lines are influenced. Therefore, it is possible to detect misalignment between single-color images in both the main-scanning and sub-scanning directions using the misalignment correction patterns as shown in FIG. 7.

An exemplary method of detecting misalignment between single-color images is described below in more detail.

Misalignment between single-color images in the main-scanning direction is detected as described below. The printer control unit 260 compares the amount of time between the detection of a line BK1 and the detection of a line BK2 by the sensor 140 and the amount of time between the detection of a line C1 and the detection of a line C2 by the sensor 140. The printer control unit 260 retains the time difference as a difference TBKC12.

In a similar manner, the printer control unit 260 compares the amount of time between the detection of a line BK3 and the detection of a line BK4 by the sensor 150 and the amount of time between the detection of a line C3 and the detection of a line C4 by the sensor 150. The printer control unit 260 retains the time difference as a difference TBKC34.

A magnification error of a cyan-color image with respect to a black-color image is obtained by the following formula: TBKC34−TBKC12. The printer control unit 260 causes the pixel clock generating unit 250 to change the frequency of the pixel clock signal PCLK to compensate for the obtained magnification error. Also, the amount of misalignment in the main-scanning direction of the cyan-color image with respect to the black-color image is obtained by subtracting the amount of time corresponding to the magnification error from the difference TBKC12. The printer control unit 260 causes the initial-writing-position adjusting unit 220 to change the output timing of the main-scanning gate signal XLGATE, which determines the timing to start image data writing, according to the obtained amount of misalignment in the main-scanning direction. Misalignment of a magenta-color image and a yellow-color image in the main-scanning direction is also corrected in substantially the same manner.

Misalignment between single-color images in the sub-scanning direction is detected as described below. The printer control unit 260 calculates the amount of time TBKC1 between the detection of the line BK1 and the detection of the line C1 by the sensor 140. The printer control unit 260 also calculates the amount of time TBKC3 between the detection of the line BK3 and the detection of the line C3 by the sensor 150. The amount of misalignment in the sub-scanning direction of the cyan-color image with respect to the black-color image is obtained by the following formula: (TBKC1+TBKC3)/2−Tc. In this formula, Tc indicates a standard amount of time. The printer control unit 260 causes the initial-writing-position adjusting unit 220 to change the output timing of the sub-scanning gate signal XFGATE, which determines the timing to start image data writing, according to the obtained amount of misalignment in the sub-scanning direction. Misalignment of the magenta-color image and the yellow-color image in the sub-scanning direction is also corrected in substantially the same manner.

Thus, the printer control unit 260 calculates the amounts of misalignment between single-color images in the main-scanning and sub-scanning directions based on the results of detecting misalignment correction patterns. The printer control unit 260 stores the calculated amounts of misalignment as correction data in the correction data storage unit 270. The correction data stored in the correction data storage unit 270 are used to correct misalignment and magnification errors of single-color images. In other words, the correction data are used to determine the frequency of the pixel clock signal PCLK and the output timings of the main-scanning gate signal XLGATE and the sub-scanning gate signal XFGATE. After storing the correction data in the correction data storage unit 270, the printer control unit 260 sets the correction data in other control units of the image formation control unit 200.

Figure 8:
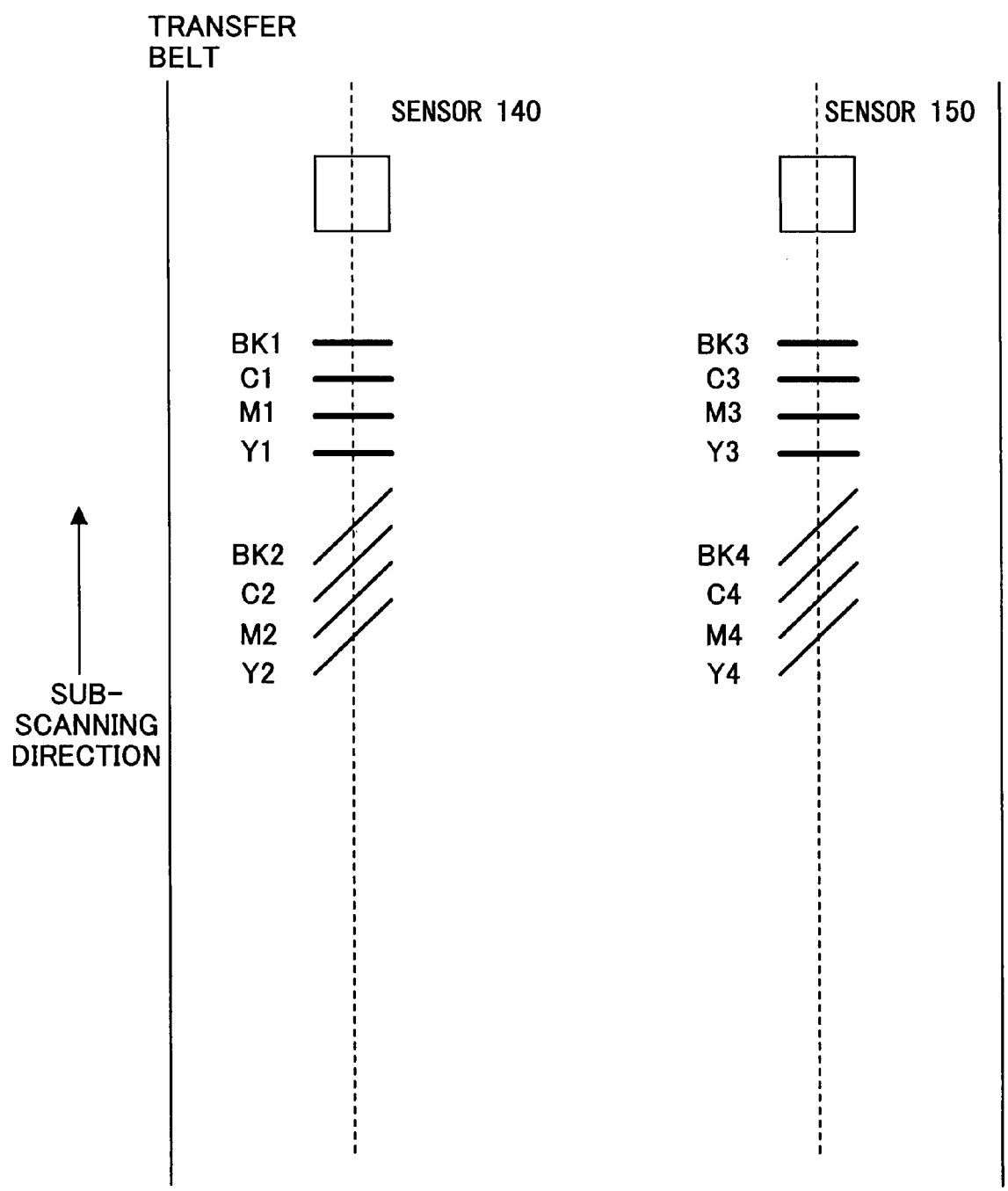
FIG. 8 is a first drawing illustrating other exemplary misalignment correction patterns according to the first embodiment.

FIG. 8 is a first drawing illustrating other exemplary misalignment correction patterns according to the first embodiment.

Compared with the misalignment correction patterns shown in FIG. 7, lines constituting the misalignment correction patterns shown in FIG. 8 are arranged at shorter intervals in the sub-scanning direction. Also, the lengths in the main-scanning direction of the lines constituting the misalignment correction patterns shown in FIG. 8 are shorter than those of the lines constituting the misalignment correction patterns shown in FIG. 7.

Accordingly, the time necessary to detect the misalignment correction patterns shown in FIG. 8 by the sensors 140 and 150 is shorter than that necessary to detect the misalignment correction patterns shown in FIG. 7. Also, the misalignment correction patterns shown in FIG. 8 are more suitable than those shown in FIG. 7 to detect a small amount of misalignment between single-color images. Therefore, the misalignment correction patterns shown in FIG. 8 are preferably used when performing a misalignment correction process after a short period of time from the previous misalignment correction process.

In the example shown in FIG. 8, both the intervals and lengths of the lines are shorter than those shown in FIG. 7. Alternatively, only the intervals or the lengths of the lines may be made shorter than those shown in FIG. 7.

Figure 9:
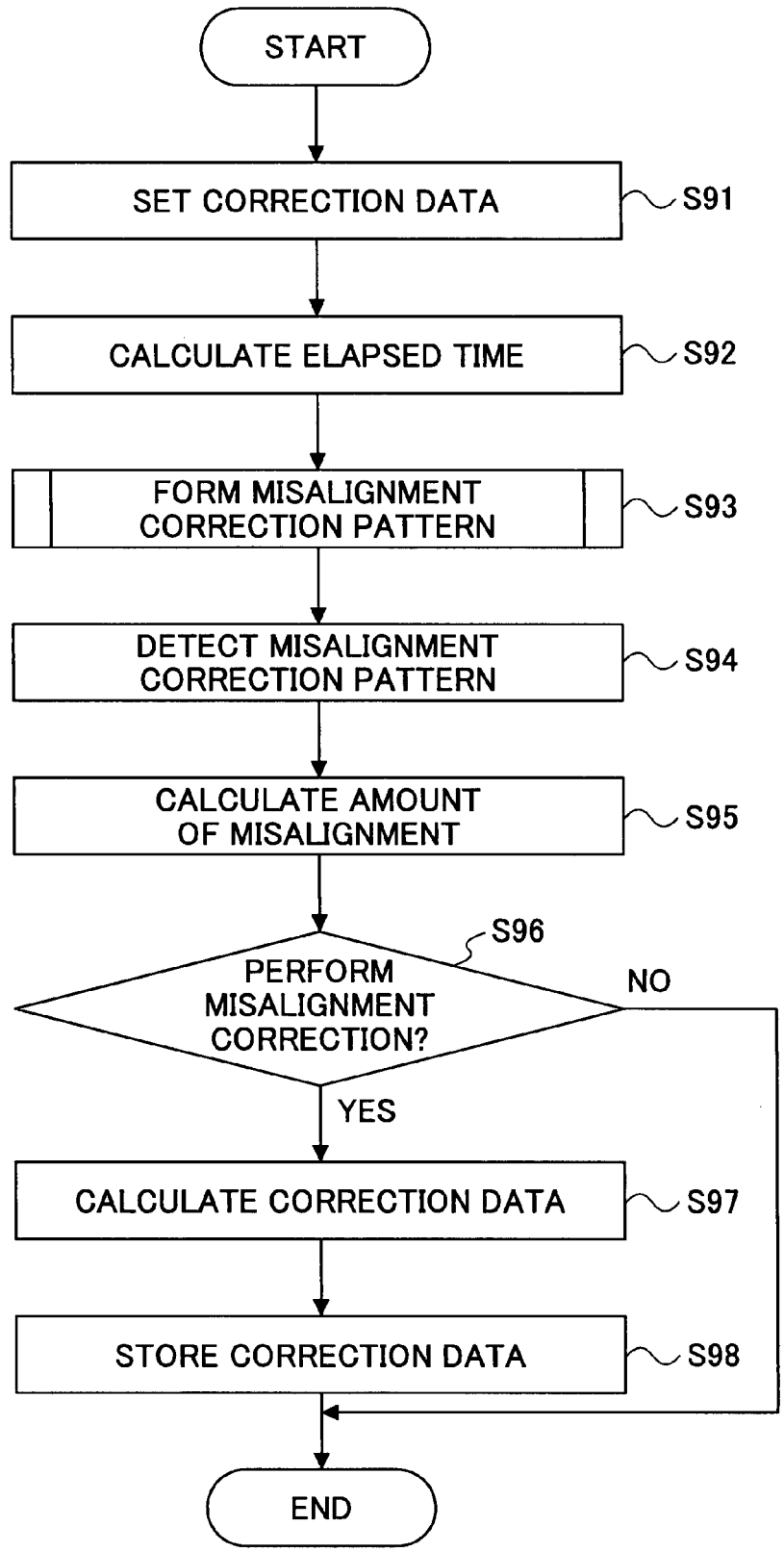
FIG. 9 is a flowchart showing an exemplary misalignment correction process in the image forming apparatus 100 according to the first embodiment.

An exemplary process of correcting misalignment between single-color images in the image forming apparatus 100 of this embodiment is described below with reference to FIG. 9. FIG. 9 is a flowchart showing an exemplary misalignment correction process in the image forming apparatus 100 of the first embodiment.

The printer control unit 260 performs a misalignment correction process at a predetermined timing. The timing for performing a misalignment correction process may be set, for example, by an administrator or a user of the image forming apparatus 100 via a setting unit (not shown) of the image forming apparatus 100. The setting of the timing may be stored in a storage unit (not shown) of the image forming apparatus 100.

When a misalignment correction process is started in the image forming apparatus 100, the printer control unit 260 sets correction data stored in the correction data storage unit 270 in other control units of the image formation control unit 200 (S91). If a misalignment correction process has been performed previously, the correction data obtained in the previous misalignment correction process are used in this step. If no misalignment correction process has been performed previously in the image forming apparatus 100, predetermined initial values are used as the correction data.

After setting the correction data in the other control units, the printer control unit 260 calculates the time elapsed after the previous misalignment correction process is performed (S92). In this embodiment, if one or more hours have elapsed after the previous misalignment correction process, the printer control unit 260 forms the misalignment correction patterns shown in FIG. 7 and transfers the patterns onto the transfer belt 130. If less than one hour has elapsed after the previous misalignment correction process, the printer control unit 260 forms the misalignment correction patterns shown in FIG. 8 and transfers the patterns onto the transfer belt 130 (S93).

The misalignment correction patterns transferred onto the transfer belt 130 are detected by the sensors 140 and 150 (S94). The printer control unit 260 calculates the amounts of misalignment between single-color images based on the detection results from the sensors 140 and 150 (S95).

Then, the printer control unit 260 determines whether to perform misalignment correction based on the calculated amounts of misalignment (S96). In this embodiment, the printer control unit 260 performs misalignment correction if any one of the amounts of misalignment obtained in step S95 is equal to or larger than one half of the correction resolution of the image forming apparatus 100.

If Yes in step S96, the printer control unit 260 calculates correction data based on the amounts of misalignment obtained in step S95 (S97), stores the calculated correction data in the correction data storage unit 270 (S98), and terminates the misalignment correction process. If No in step S96, the printer control unit 260 terminates the misalignment correction process without updating the correction data stored in the correction data storage unit 270. In other words, new correction data are not stored in the correction data storage unit 270.

When an image is formed by the image forming apparatus 100 after the above misalignment correction process, the updated or non-updated correction data in the correction data storage unit 270 are set in control units of the image formation control unit 200.

In this embodiment, misalignment correction patterns are selected based on the time elapsed after the previous misalignment correction process is performed. Alternatively, misalignment correction patterns may be selected based on the number of images formed or the number of pages printed after the previous misalignment correction process is performed. Also, misalignment correction patterns may be selected based on a status change such as a change in temperature or humidity in the image forming apparatus 100 or in a space where the image forming apparatus 100 is installed. Thus, a status change in this embodiment indicates at least a temperature change, a humidity change, or the time elapsed after the previous misalignment correction process is performed.

Misalignment correction patterns are not limited to horizontal lines and diagonal lines.

In the examples shown in FIGS. 7 and 8, misalignment correction patterns comprise two sets of horizontal lines and diagonal lines and one of the two sets is formed on the side of the sensor 140 and the other one of the two sets is formed on the side of the sensor 150. However, arrangement of misalignment correction patterns is not limited to that shown in FIGS. 7 and 8.

Figure 10:
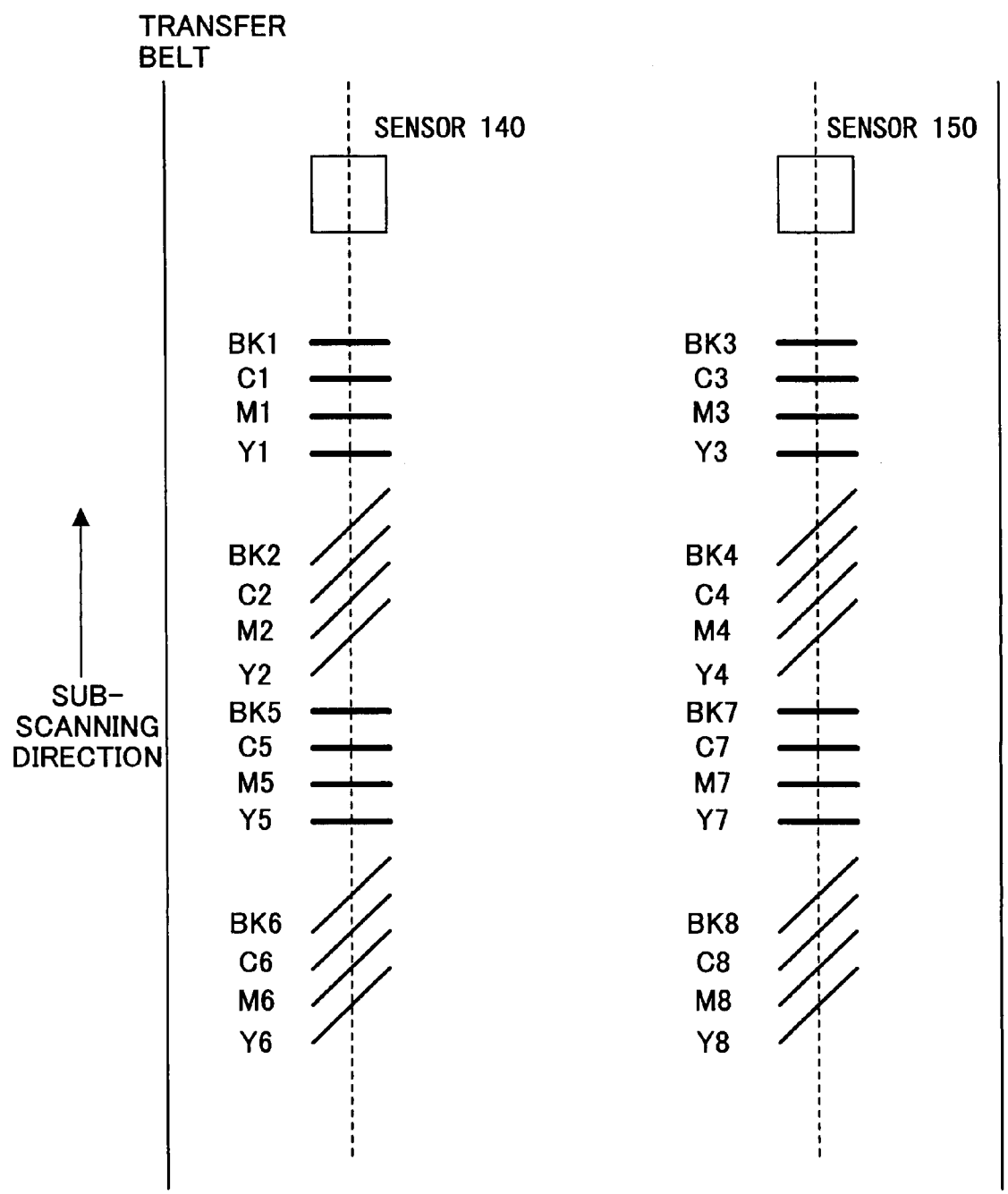
FIG. 10 is a second drawing illustrating still other exemplary misalignment correction patterns according to the first embodiment.

FIG. 10 is a second drawing illustrating still other exemplary misalignment correction patterns according to the first embodiment.

In the example shown in FIG. 10, two sets of the misalignment correction patterns shown in FIG. 8 are formed for each of the sensors 140 and 150. In this case, misalignment correction may be performed based on an average of the amount of misalignment obtained from a first set of horizontal and diagonal lines and the amount of misalignment obtained from a second set of horizontal and diagonal lines.

With a configuration as described above, the image forming apparatus 100 can perform misalignment correction according to its conditions and use environment. Also, the image forming apparatus 100 with a configuration as described above can accurately correct misalignment between single-color images without reducing the printing speed.

Second Embodiment

A second embodiment of the present invention is described below with reference to the accompanying drawings. The second embodiment of the present invention is substantially the same as the first embodiment except that misalignment correction patterns are formed between a preceding image and a succeeding image when multiple images are formed successively by the image forming apparatus 100. The descriptions below are focused on formation of misalignment correction patterns according to the second embodiment. Also, the same reference numbers are used for components corresponding to those described in the first embodiment, and descriptions of those components are omitted.

Figure 11:
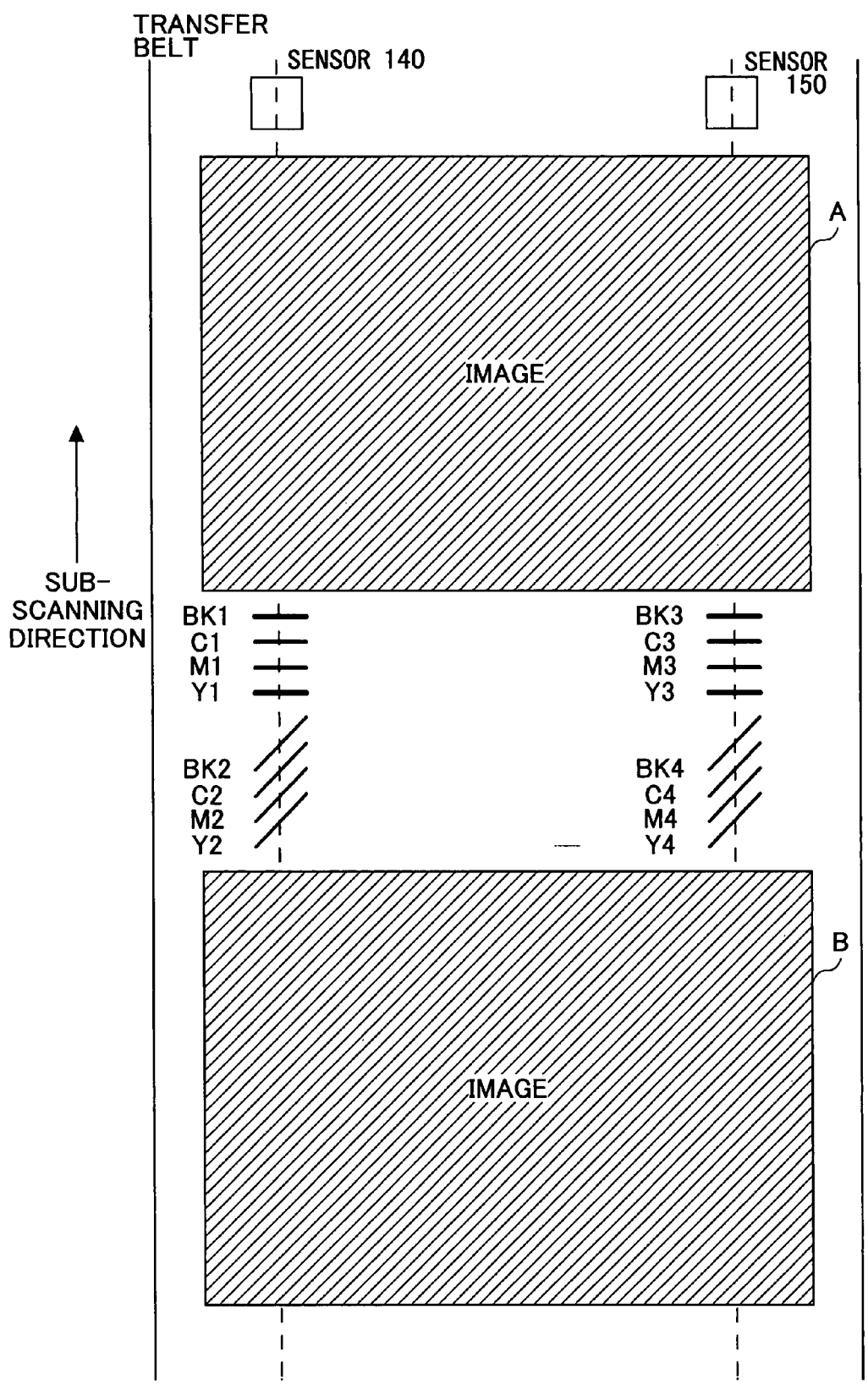
FIG. 11 is a drawing illustrating exemplary misalignment correction patterns according to a second embodiment of the present invention.

FIG. 11 is a drawing illustrating exemplary misalignment correction patterns according to the second embodiment.

The method of detecting misalignment between single-color images used in the second embodiment is substantially the same as that used in the first embodiment. In FIG. 11, it is assumed that images A and B are formed and printed successively by the image forming apparatus 100. Misalignment correction patterns are formed between the images A and B.

The intervals and lengths of lines constituting the misalignment correction patterns formed between the images A and B are preferably shorter than those of lines constituting the misalignment correction patterns formed before the image A is formed. In other words, the intervals and lengths of lines constituting the misalignment correction patterns used to correct misalignment for the image B are preferably shorter than those of lines constituting the misalignment correction patterns used to correct misalignment for the image A.

For example, the misalignment correction patterns shown in FIG. 7 may be used for the image A and those shown in FIG. 8 may be used for image B. Selecting misalignment correction patterns as described above makes it possible to accurately and quickly perform misalignment correction for the image B following the misalignment correction for the image A. This method makes it possible to accurately perform misalignment correction for each of the images to be formed successively without reducing the printing speed.

Figure 12:
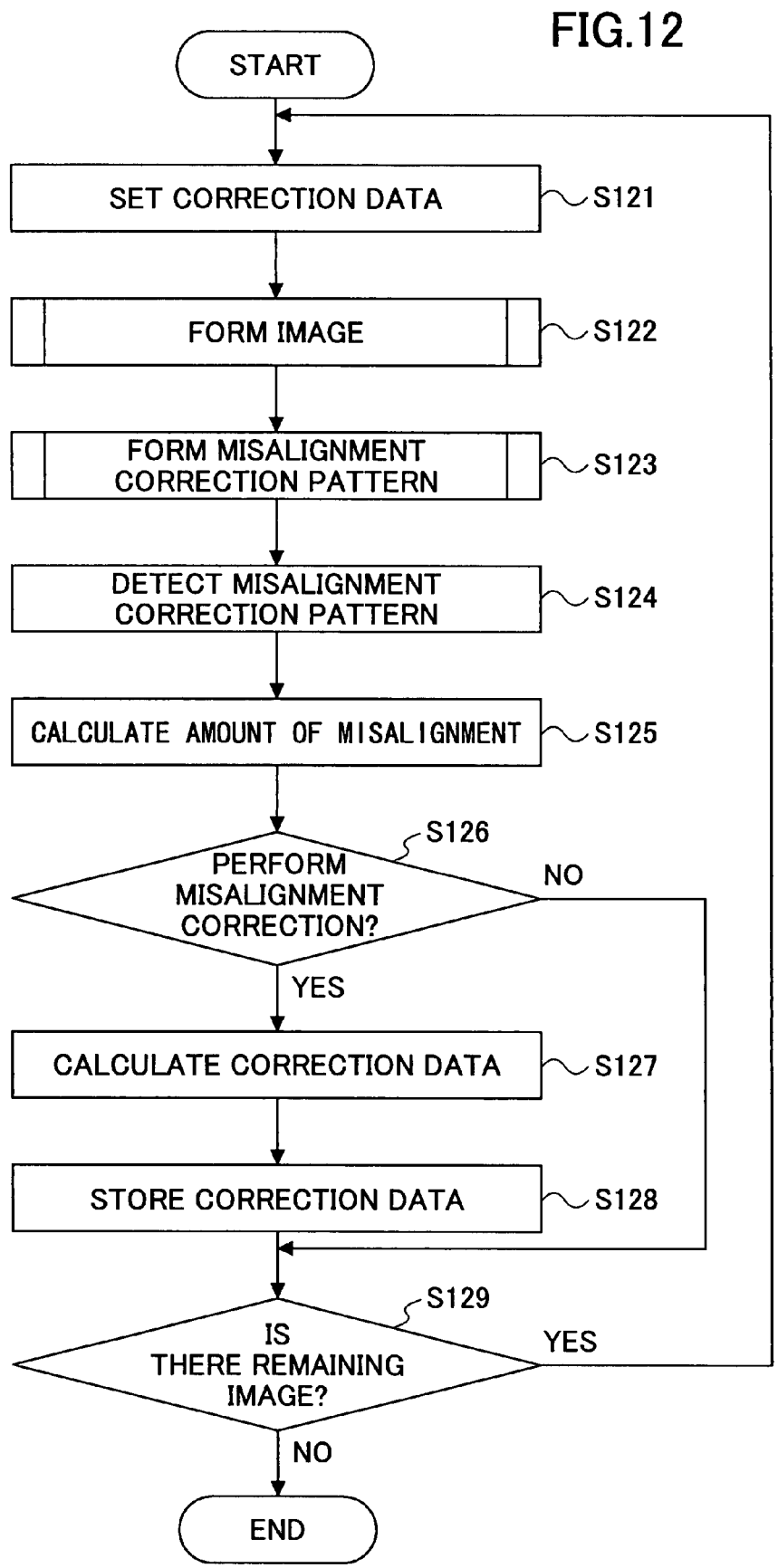
FIG. 12 is a flowchart showing an exemplary misalignment correction process according to the second embodiment.

An exemplary misalignment correction process according to the second embodiment is described below. FIG. 12 is a flowchart showing an exemplary misalignment correction process according to the second embodiment.

When a misalignment correction process is started in the image forming apparatus 100, the printer control unit 260 sets correction data stored in the correction data storage unit 270 in other control units of the image formation control unit 200 (S121). If a misalignment correction process has been performed previously, the correction data obtained in the previous misalignment correction process are used in this step. If no misalignment correction process has been performed previously in the image forming apparatus 100, predetermined initial values are used as the correction data.

After setting the correction data, the printer control unit 260 forms a first one (image A) of images to be formed successively (S122). After forming the first image (image A), the printer control unit 260 forms misalignment correction patterns between the first image (image A) and a second image (image B) to be formed next (S123). The formed misalignment correction patterns are detected by the sensors 140 and 150 (S124). Since steps S124 through S128 in FIG. 12 are substantially the same as steps S94 through S98 in FIG. 9, descriptions of steps S124 through S128 are omitted here.

After storing correction data in the correction data storage unit 270 in step S128, the printer control unit 260 determines whether there is a remaining image to be formed (S129). If there is a remaining image, the printer control unit repeats steps S121 through S128. If there is no remaining image or if printing of all images is completed, the printer control unit 260 terminates the misalignment correction process.

In this embodiment, correction data are used in the next image forming step just after the correction data are obtained. However, this is not possible if the distance between a preceding image (image A) and a succeeding image is too short. In such a case, the obtained correction data may be used to form an image at a later step.

The method of misalignment correction performed between image forming steps in the second embodiment is substantially the same as that described in the first embodiment.

Misalignment correction patterns usable in this embodiment are not limited to those shown in FIG. 11.

Figure 13:
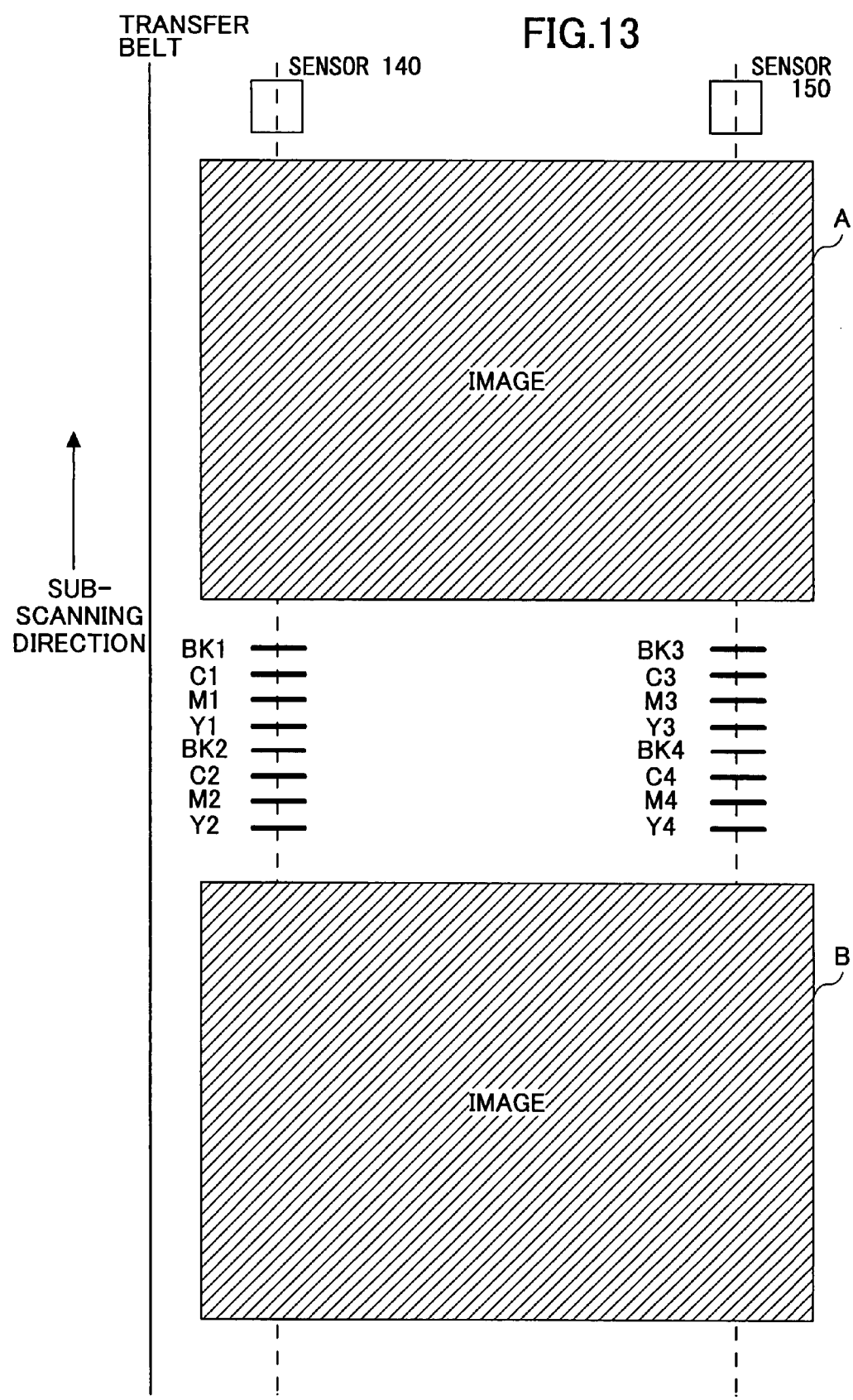
FIG. 13 is a first drawing illustrating other exemplary misalignment correction patterns according to the second embodiment.

FIG. 13 is a first drawing illustrating other exemplary misalignment correction patterns according to the second embodiment.

In FIG. 13, misalignment correction patterns comprising only horizontal lines for correcting misalignment in the sub-scanning direction are formed between the images A and B. More specifically, two sets of horizontal lines are formed for each of the sensors 140 and 150. In this case, misalignment correction may be performed based on an average of the amount of misalignment obtained from a first set of horizontal lines and the amount of misalignment obtained from a second set of horizontal lines.

In the example shown in FIG. 13, misalignment correction patterns for correcting misalignment only in the sub-scanning direction are used. Alternatively, misalignment correction patterns for correcting misalignment only in the main-scanning direction may be used. Also, it is possible to alternately form misalignment correction patterns for correcting misalignment in the sub-scanning direction and misalignment correction patterns for correcting misalignment in the main-scanning direction. For example, misalignment correction patterns for correcting misalignment in the sub-scanning direction may be formed between the images A and B and misalignment correction patterns for correcting misalignment in the main-scanning direction may be formed between the image B and a subsequent image C (not shown).

Figure 14:
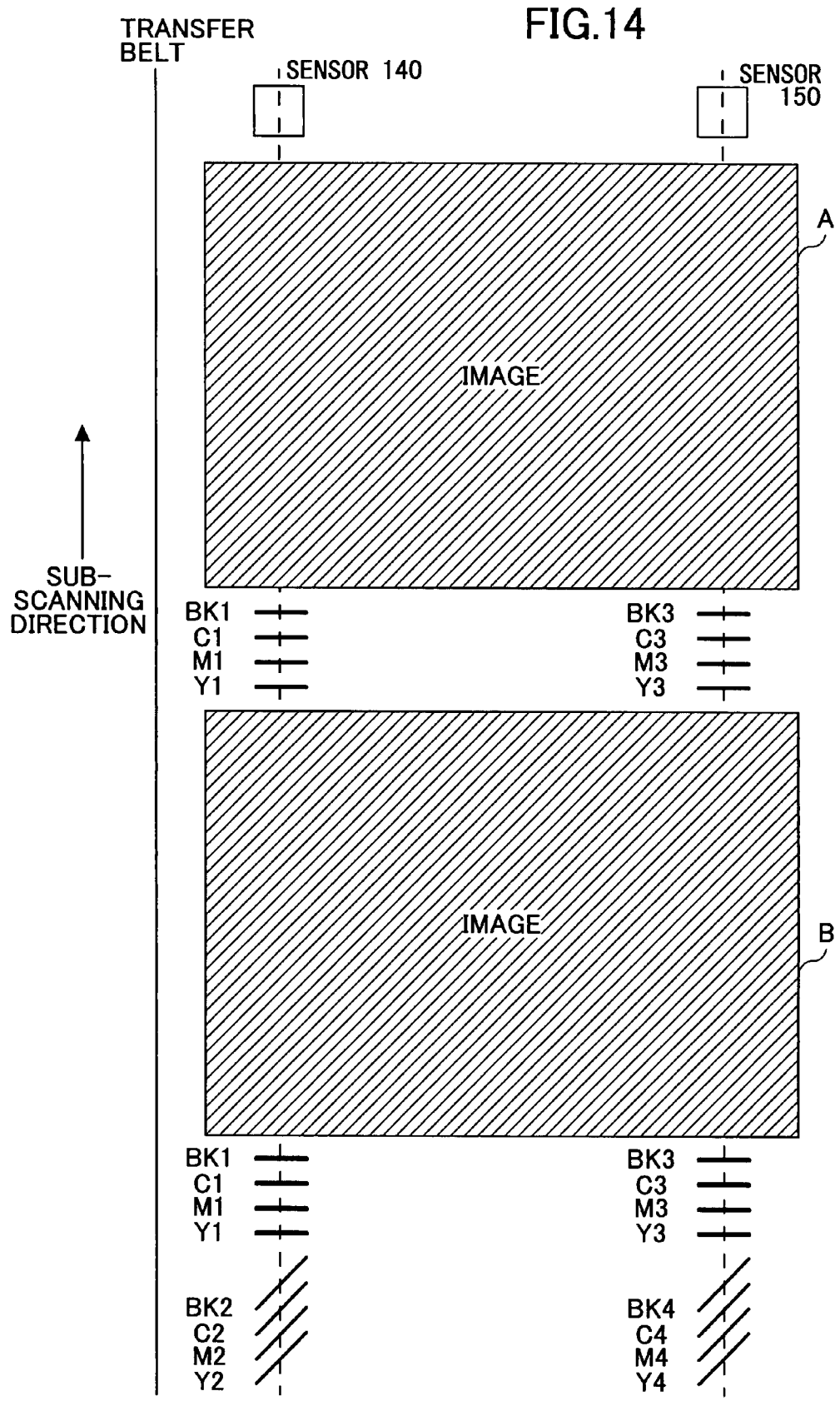
FIG. 14 is a second drawing illustrating still other exemplary misalignment correction patterns according to the second embodiment.

FIG. 14 is a second drawing illustrating still other exemplary misalignment correction patterns according to the second embodiment.

In the example shown in FIG. 14, misalignment correction patterns for correcting misalignment in the sub-scanning direction are formed between the images A and B and misalignment correction patterns for correcting misalignment in both the main-scanning and sub-scanning directions are formed between the image B and the image C (not shown).

Thus, according to this embodiment, the frequency of forming misalignment correction patterns for correcting misalignment in the main-scanning direction and the frequency of forming misalignment correction patterns for correcting misalignment in the sub-scanning direction may be changed. For example, it is possible to set the frequency of forming misalignment correction patterns comprising horizontal lines for correcting sub-scanning direction misalignment higher than the frequency of forming misalignment correction patterns comprising diagonal lines for correcting main-scanning direction misalignment. Also, the frequencies of forming misalignment correction patterns may be determined according to the tendency of misalignment between single-color images in an image forming apparatus.

An image forming apparatus with a configuration as described above can correct misalignment between single-color images without reducing the printing speed even when forming multiple images successively.

The present invention is applicable to an image forming apparatus that forms a multicolor image by superposing single-color images.

The present invention is not limited to the specifically disclosed embodiments, and variations and modifications may be made without departing from the scope of the present invention.

The present application is based on Japanese Priority Application No. 2006-253506, filed on Sep. 19, 2006, the entire contents of which are hereby incorporated herein by reference.

What is claimed is:

1. An image forming apparatus for forming a multicolor image by superposing single-color images of respective colors, comprising:

an image formation control unit configured to select and form a plurality of sets of misalignment correction patterns used in a misalignment correction process for correcting misalignment between single-color images, wherein the image formation control unit is configured to perform the misalignment correction process based on an average of an amount of misalignment obtained from a first set of misalignment correction patterns of the plurality of sets and an amount of misalignment obtained from one or more following sets of misalignment correction patterns of the plurality of sets, and the image formation control unit is configured to select at least one of the first set and the one or more following sets of misalignment correction patterns according to either at least one of a status change detected and a number of images formed after a previous misalignment correction process is performed.

2. The image forming apparatus as claimed in claim 1, further comprising:

image carriers on which latent images corresponding to the single-color images are formed by a light beam emitted according to image data;

developing units configured to develop the latent images formed on the image carriers and thereby to form the single-color images; and a transfer body onto which the formed single-color images are transferred in sequence.

3. The image forming apparatus as claimed in claim 1, wherein the image formation control unit is configured to select the at least one of the first set and the one or more following sets of misalignment correction patterns according to the status change, and the status change indicates at least a temperature change.

4. The image forming apparatus as claimed in claim 1, wherein the image formation control unit is configured to form the one or more following sets of misalignment correction patterns sufficiently quickly for accurate correction of misalignment between single-color images without reducing a printing speed.

5. The image forming apparatus as claimed in claim 1, wherein the image formation control unit is configured to select the at least one of the first set and the one or more following sets of misalignment correction patterns according to the status change, and
the status change indicates at least a humidity change.

6. The image forming apparatus as claimed in claim 1, wherein the image formation control unit is configured to select the at least one of the first set and the one or more following sets of misalignment correction patterns according to the status change, and
the status change indicates at least a time elapsed after the previous misalignment correction process is performed.

7. An image forming apparatus for forming a multicolor image by superposing single-color images of respective colors, comprising:
an image formation control unit configured to form a plurality of types of misalignment correction patterns for correcting misalignment between single-color images,
wherein the image formation control unit is configured to form a first misalignment correction pattern for a first one of multicolor images to be formed successively and to form a second misalignment correction pattern that is a different type of misalignment correction pattern from the first misalignment correction pattern for a next one of the multicolor images.

8. The image forming apparatus as claimed in claim 7, further comprising:
image carriers on which latent images corresponding to the single-color images are formed by a light beam emitted according to image data;
developing units configured to develop the latent images formed on the image carriers and thereby to form the single-color images; and
a transfer body onto which the formed single-color images are transferred in sequence.

9. The image forming apparatus as claimed in claim 7, wherein the second misalignment correction pattern is either a main-scanning-direction misalignment correction pattern for correcting the misalignment in a main-scanning direction.

10. The image forming apparatus as claimed in claim 7, wherein the image formation control unit is configured to alternate between formation of a main-scanning-direction misalignment correction pattern for correcting the misalignment in a main-scanning direction and a sub-scanning-direction misalignment correction pattern for correcting the misalignment in a sub-scanning direction.

11. The image forming apparatus as claimed in claim 7, wherein the plurality of types of misalignment correction patterns include a main-scanning-direction misalignment correction pattern for correcting the misalignment in a main-scanning direction and a sub-scanning-direction misalignment correction pattern for correcting the misalignment in a sub-scanning direction, and
the image formation control unit is configured to change frequencies of forming the main-scanning-direction misalignment correction pattern and the sub-scanning-direction misalignment correction pattern.

12. The image forming apparatus as claimed in claim 7, wherein the image formation control unit is configured to form the second misalignment correction pattern sufficiently quickly to accurately correct misalignment between single-color images prior to formation of the next one of the multicolor images without reducing a printing speed.

13. The image forming apparatus as claimed in claim 7, wherein the image forming apparatus is configured to determine a distance between a preceding image and a succeeding image, and upon determining that the distance is less than a reference distance, postpone correction of misalignment until after the succeeding image is formed.

14. The image forming apparatus as claimed in claim 7, wherein the second misalignment correction pattern is a sub-scanning-direction misalignment correction pattern for correcting the misalignment in a sub-scanning direction.

15. A method of forming a multi-color image by superposing single-color images of respective colors, comprising:
selecting a combination of a first set of misalignment correction patterns and at least one following set of misalignment correction patterns from a plurality of sets of misalignment correction patterns according to at least one of a detected status change and a number of images formed after a previous misalignment correction process is performed;
forming the first set of misalignment correction patterns and the at least one following set of misalignment correction patterns;
obtaining a first amount of single-color image misalignment of the first set of misalignment correction patterns and a second amount of single-color image misalignment of the at least one following set of misalignment correction patterns; and
correcting for single-color image misalignment based on an average of the first and second amounts of single-color image misalignment obtained from the first set and the at least one following set.

16. A method of forming a multi-color image by superposing single-color images of respective colors, comprising:
forming a first misalignment correction pattern for a first one of multicolor images to be formed successively; and
forming a second misalignment correction pattern that is a different type of misalignment correction pattern from the first misalignment correction pattern for a next one of the multicolor images,
wherein the first and second misalignment correction patterns are used for correcting misalignment between single-color images.

17. A method of forming a multi-color image by superposing single-color images of respective colors, comprising:
forming a first misalignment correction pattern;
detecting first single-color image misalignment using the first misalignment correction pattern;
correcting the first single-color image misalignment;
forming a first multicolor image after the correction of the first single-color image misalignment;
forming a second misalignment correction pattern that is a different type of misalignment correction pattern than the first misalignment correction pattern after the forming of the first multicolor image;
detecting second single-color image misalignment using the second misalignment correction pattern;
correcting the second single-color image misalignment; and
forming a second multicolor image after the correction of the second single-color image misalignment.

* * * * *